No. 658,719. Patented Sept. 25, 1900.
J. D. DOWELL & L. M. GALLIHER.
NUT LOCK.
(Application filed Mar. 26, 1900.)

(No Model.)

WITNESSES:
Jos. A. Ryan
Edw. W. Byrn

INVENTORS
Jeff Davis Dowell
Lawrence M. Galliher
BY Munn & Co.
ATTORNEYS

UNITED STATES PATENT OFFICE.

JEFF DAVIS DOWELL AND LAWRENCE M. GALLIHER, OF MINEOLA, TEXAS.

NUT-LOCK.

SPECIFICATION forming part of Letters Patent No. 658,719, dated September 25, 1900.

Application filed March 26, 1900. Serial No. 10,187. (No model.)

*To all whom it may concern:*

Be it known that we, JEFF DAVIS DOWELL and LAWRENCE M. GALLIHER, of Mineola, in the county of Wood and State of Texas, have invented a new and useful Improvement in Nut-Locks, of which the following is a specification.

Our invention is in the nature of a new and improved nut-lock that is designed to hold a nut in any position and which may be released without injury to the lock and is adapted to take up expansion and contraction and is applicable to all kinds of uses—such as for bridges, cars, railroad-tracks, wagons, ship-building, &c.—and which is adapted also to take the place of a washer.

It consists in the peculiar construction of the device, which we will now proceed to describe with reference to the drawings, in which—

Figure 1:
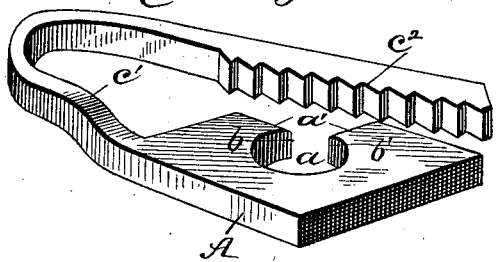
Figure 2:
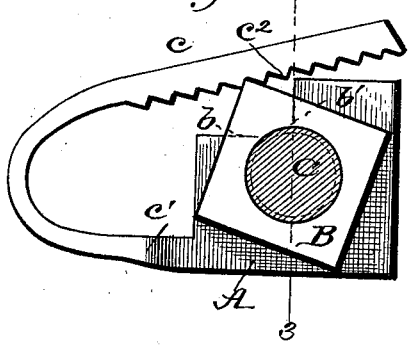
Figure 3:
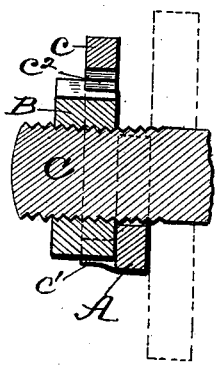

Figure 1 is a perspective view of the nut-lock. Fig. 2 shows it applied to a nut and bolt, and Fig. 3 is a section through line 3 3 of Fig. 2.

A represents a stout plate of a generally square shape with a central hole $a$ through it to permit the passage of the bolt through the same and having the metal cut away at $a'$ at one of the corners, so as to leave the bolt-hole open on one side, with projecting corners at $b\ b'$, where the central hole opens into the cut-away side.

Attached to the plate and formed in one piece with the same is an arm $c$, which is offset at $c'$ to the front side of the plane of the plate and is then bent over the plate, so as to overhang the nut. This portion of the arm is formed with a series of ratchet-teeth $c^2$ on the side facing the nut, which teeth project or incline in the direction in which the nut turns on the threaded end of the bolt, so as to engage the right-angular corners of the nut and by engaging with any one of the same acts thereagainst as a detent to prevent the nut from turning backward.

In applying the nut-lock it is slipped over the end of the bolt C before the nut B is applied to the same, so that the body or plate portion A lies between the nut in front and the fish-plate or timbers or other back bearing in the rear. When the nut is turned up tightly, this washer is forced against the said back bearing and is tightly clamped between the same and the nut, so that the corners $b\ b'$ bury to some extent in the back bearing to prevent turning with the nut. When the nut is turned up to this tightly-clamped position, its corners act against the ratchet-teeth of the bent arm, and the latter springs back far enough to allow the corners of the nut to pass until fully turned up, at which time the ratchet-teeth by engaging with the corners of the nut prevent the unscrewing of the nut. To take off the nut, this spring-arm is pressed far enough away from the nut to allow its corners to pass the ratchet-teeth in moving backward. This permits the nut-lock to be removed without breaking or damaging the same in any way, so that it may be used over and over again, permitting the nut to be taken off and screwed on again as often as may be desired for tightening up or readjusting the parts.

We are aware that a nut-lock has been constructed consisting of a metal bar bent to form an eye and then extended in a straight tangential line and bent over in a plane at right angles to the eye and returned to the eye on the same side and there provided with notches to engage the corner of the nut. Our invention consists of a flat base-plate having an arm extending from one corner and offset to a different plane and then bent over with a gradual curve and returned to the base-plate upon the opposite side of the same from which it started. The advantages of this construction are that it gives a more elastic spring for the notched arm, adapting it to nuts of different sizes, and gives a construction that may be cheaply stamped out of a single plate of metal at one operation.

Having thus described our invention, what we claim as new, and desire to secure by Letters Patent, is—

1. A nut-lock comprising a flat base-plate having a bolt-hole, and having integral with said base-plate an arm extended from the corner of the base-plate, offset to a different plane from the base-plate, and then bent over with a gradual curve to the opposite side of the base-plate from that whence it proceeded, and having serrations adapted to engage the corners of the nut as described.

2. A nut-lock comprising a flat base-plate having a bolt-hole with a section of the base-plate cut away at one corner into the bolt-hole forming sharp-angle corners $b\ b'$, and having also integral with the base-plate at the adjacent corner an arm offset to a different plane and then bent over with a gradual curve to the opposite side of the base-plate whence it started, and having notches or serrations adapted to engage the corners of the nut substantially as shown and described.

In testimony whereof we have signed our names to this specification in the presence of two subscribing witnesses.

JEFF DAVIS DOWELL.
LAWRENCE M. GALLIHER.

Witnesses:
M. H. VANDIVER,
J. M. B. SPEIGHTES.